Dec. 26, 1961 W. L. WALSH 3,014,941
PROCESS OF TRANSALKYLATING ALUMINUM ALKYLS
Filed Dec. 5, 1957
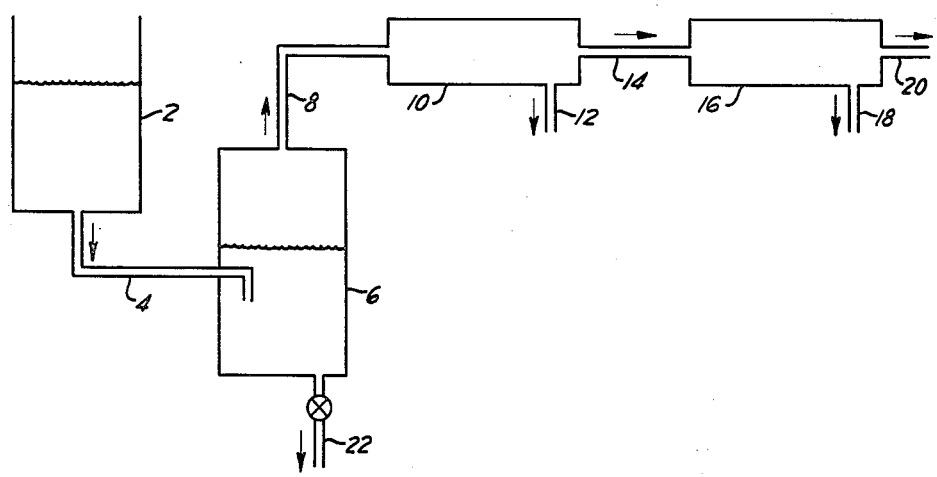
INVENTOR.
WILLIAM L. WALSH
BY
ATTORNEY 3,014,941
PROCESS OF TRANSALKYLATING
ALUMINUM ALKYLS
William L. Walsh, Glenshaw, Pa., assignor to Goodrich-Gulf Chemicals, Inc., Pittsburgh, Pa., a corporation of Delaware
Filed Dec. 5, 1957, Ser. No. 700,908
16 Claims. (Cl. 260—448)

This invention relates to organo-metallo compounds and particularly to an improved process for transalkylating organo-metallo compounds while inhibiting the formation of dimer.

Organo-metallo compounds can be reacted with an olefin to form a resultant compound comprised of the metal portion of the organo-metallo compound and said olefin. The resultant compound can be employed as catalyst, hydrolyzed to obtain hydrocarbons, oxidized and subsequently hydrolyzed to obtain alcohols, chlorinated to obtain primary alkyl chlorides, etc. Unfortunately in the process of reacting the organo-metallo compound with the olefin, there is a tendency for the olefin to attach itself to an olefin which has already replaced the organic radical on the organo-metallo compound. Consequently when the resultant compound identified above is subsequently subjected to further reactions, dimers of hydrocarbons such as higher olefins and lesser amounts of compounds such as alcohols, primary alkyl chlorides, etc., are formed. The formation of such dimers reduces the amount of desirable product produced and requires an additional separation step in order to obtain the desired product.

I have found that the dimer formation identified above can be inhibited by carrying out the reaction between the organo-metallo compound and the olefin while maintaining the concentration of said olefin throughout such reaction period below about 6 percent by weight.

The organo-metallo compounds which can be employed in the reaction with the olefin can be represented by the following structural formula:

$$R_xMe$$

wherein R is hydrogen or a hydrocarbon radical having from 2 to 35 carbon atoms in the molecule, preferably 2 to 20 carbon atoms, such as alkyl, aryl, alkaryl, aralkyl, cycloalkyl, alkenyl, aralkenyl, or cycloalkenyl, straight or branch chained, or a substituted hydrocarbon radical, with the number of hydrogen atoms being generally no more than one per metal atom. Me is a metal such as aluminum, antimony, bismuth, cadmium, copper, gallium, germanium, indium, lead, mercury, thallium, tin and zinc, and $x$ is the valence of Me. Examples of such organo-metallo compounds are triethylaluminum, tripropylaluminum, triisobutylaluminum, trihexylaluminum, triheptylaluminum, trioctylaluminum, tridecylaluminum, trihexyldecylaluminum, trioctadecylaluminum, trieicosylaluminum, tritetracosamylaluminum, trihexacosamylaluminum, trioctacosamylaluminum, triethylgallium, tripropylgallium, trioctylgallium, tridecylgallium, diethyllead, dioctyllead, didecyllead, ditetradecyllead, triethylantimony, trihexylantimony, tridecylantimony, tritetradecylantimony, trieicosylantimony, diethylmercury, dodecylmercury, dioctylmercury, etc. Preferred among the compounds for use in the process of this invention are aluminum alkyls, for example, aluminum trialkyls.

Olefins having from 2 to 40 carbon atoms, preferably 2 to 30 carbon atoms, in the molecule can be used in the reaction with the organo-metallo compound. Alpha olefins having from one to 30 carbon atoms more than the organic portion of the organo-metallo compound are especially preferred. Examples of olefins which can be used in the present process are ethylene, propylene, butene-1, butene-2, hexene-1, hexene-2, octene-1, octene-2, 2-ethylhexene-1, decene-1, decene-2, docene-1, docene-2, tetradecene-1, tetradecene-2, octadecene-1, octadecene-2, eicosene-1, eicosene-2, docosene-1, docosene-2, tetracosene-1, tetracosene-2, heptacosene-1, octacosene-1, octacosene-2, 2-ethyldocene-1, 2-ethyleicosene-1, 4-hexylcosene-1, cyclohexene, vinylcyclohexene, 1-vinyl-1-cyclopentene, styrene, etc.

As noted, in the reaction between the organo-metallo compound and the olefin there is a tendency for an olefin to combine with an olefin which has already attached itself to the metal portion of the organo-metallo compound and therefore form an undesirable dimer. In accordance with the process of this invention, such dimer formation is severely inhibited by carefully controlling the concentration of the olefin in the reaction mixture. Such dimer formation is effectively inhibited by maintaining less than about six percent by weight, and preferably less than about three percent by weight, of olefin based on the total weight of the reaction mixture throughout the reaction period. While there is no theoretical lower limit of olefin, as long as some olefin is present to react with the organo-metallo compound, from a practical consideration I prefer to have at least about  percent by weight of olefin present throughout the reaction period. In determining the concentration of the olefin required, the basis is made to reside on the total amount of organo-metallo compound and transalkylated product which is present. Thus at the beginning of the reaction, the weight percent of olefin in the reaction mixture is made dependent upon the weight of organo-metallo compound; as the reaction proceeds, the weight percent of olefin depends on the sum total weight of the organo-metallo compound and the transalkylated product formed, and near the end of the reaction period the weight percent of olefin depends almost solely on the weight of the transalkylated product formed.

Even though the amount of olefin present throughout the reaction period is critical in order to inhibit the formation of dimer, extreme care must be exercised in terminating the reaction as soon as the transalkylation has been substantially completed. This is so because further residence time will result in some dimer formation even though the concentration of the olefin is within the desired limits defined above. The end point of the reaction is determined when the difference between the amount of olefin added and that collected as an off gas equals the theoretical amount needed for the transalkylation. Accordingly, the reaction period should be at least about 0.1 hour but no more than about 30 hours, preferably about one to about 10 hours.

In order to facilitate the reaction and help maintain the concentration of olefin within the desired limits, it is preferred during the reaction that the organo-metallo compound be in the liquid phase and the olefin in the gaseous phase, even though the olefin may originally have been introduced therein in liquid form. The advantage in operating in such manner is that the olefin can easily be passed through the organo-metallo compound and the unreacted or excess olefin easily removed continuously from the reaction zone in vapor form. Therefore, the temperature and pressure are extremely important and consideration must be given not only to temperatures and pressures which will produce a satisfactory reaction and avoid the formation of polymerization, decomposition, or degradation products, but also to those which will help maintain the organo-metallo compound in liquid form and the olefin to be reacted therewith in vapor form. The temperature, therefore, must be about 0° to about 300° C., preferably about 70° to about 250°

C., and the pressure about one millimeter of mercury to about 1000 pounds per square inch absolute, preferably about 20 millimeters of mercury to about 500 pounds per square inch absolute. Most especially preferred is a pressure of about 10 millimeters of mercury to about 100 pounds per square inch absolute.

The invention can further be illustrated by reference to the accompanying drawing which illustrates a preferred embodiment thereof. The drawing is hereby incorporated in and made part of the present specification.

In order to simplify the description of the process in the drawing the organo-metallo compound will be described as triisobutylaluminum and the olefin reacted therewith as octene-1. It is understood that other organo-metallo compounds and olefins can be used in place of the triisobutylaluminum and olefin, respectively, with similar effective results. The olefin, octene-1, is passed in from storage zone 2 by line 4 into reactor 6 containing the organo-metallo compound, triisobutylaluminum in liquid phase. The reactor 6 is maintained under a vacuum of 26 to 27 millimeters of mercury and therefore while octene-1 in storage zone 2 is in liquid phase, as soon as it leaves line 4 and enters reactor 6 it is in the vapor phase and passes upwardly through the organo-metallo compound in that form. The temperature is maintained at 88° to 133° C. A residence period of 6.5 hours is employed. Under these conditions the octene-1 reacts with the triisobutylaluminum with the resultant production of trioctylaluminum and isobutylene. In order to inhibit the formation of octene-1 dimers, the concentration of octene-1 within reaction zone 6 is maintained at about one percent throughout the reaction period. This is effected in the present instance by controlling the rate of flow of octene-1 into the reaction zone and by removal of unreacted octene-1 from the reaction zone by line 8. This octene-1 and isobutylene resulting from the reaction in vapor form are thus removed overhead by line 8 and passed to condenser 10 wherein, by any suitable means, a temperature of 0° C. and a pressure of 26 to 27 millimeters of mercury is maintained. Under these conditions octene-1 is condensed and removed from the system by line 12. The remainder of the gaseous mixture is thereafter passed by line 14 to condenser 16 which is maintained at a temperature of −70° C. and a pressure of 26 to 27 millimeters of mercury. If desired, the unreacted octene-1 can be recycled to storage zone 2. The isobutylene is thus condensed and removed from the system by line 18. The remainder of the gaseous mixture comprising small amounts of hydrogen, etc., is removed from the system by line 20. Under these conditions triisobutyl-aluminum is effectively transalkylated and dimerization of octene-1 is inhibited. The product is removed from reaction zone 6 by valved line 22.

The transalkylated aluminum obtained can be used as a catalyst in polymerization of olefins, such as ethylene or can further be hydrolyzed to obtain hydrocarbons, oxidized and subsequently hydrolyzed to obtain alcohols, chlorinated to obtain primary alkyl chlorides, etc. Thus the transalkylated product can preferably be hydrolyzed with about 10 to about 60 percent by weight of a hydrolysis medium such as water-hydrochloric acid, water-sulfuric acid, water-acetic acid, etc. at a temperature of about 0° to about 40° C. and a pressure of about 200 millimeters of mercury to about 500 pounds per square inch gauge. In the interest of safety it is preferred to add transalkylated product dropwise to the hydrolysis medium. Instead the transalkylated product can be oxidized in air or oxygen at a temperature of about 0° to about 200° C. and a pressure of about atmospheric to about 500 pounds per square inch for a period of about 10 minutes to about 2 hours. The oxidized product can then be preferably hydrolyzed with about 10 to about 60 percent by weight of a hydrolysis medium such as water-hydrochloric acid, water-sulfuric acid, water-acetic acid, etc. at a temperature of about 0° to about 40° C. and a pressure of about 200 millimeters of mercury to about 500 pounds per square inch to obtain an alcohol corresponding to the olefin employed in the transalkylation reaction. Or the transalkylated product can be chlorinated, preferably with about 5 to about 60 percent by weight of chlorine at a temperature of about 0° to about 40° C. and a pressure of about 200 millimeters of mercury to about 500 pounds per square inch to obtain primary alkyl chlorides.

In order further to illustrate the present invention, octene-1 was reacted with triisobutylaluminum under different conditions. In one run the olefin was reacted with the aluminum alkyl at atmospheric pressure without controlling the concentration of the olefin, while in the remaining runs the concentration of the olefin was carefully controlled throughout the reaction period. The pertinent data are summarized below in Table I.

Table I

| Experiment No. | 1 | 2 | 3 |
| --- | --- | --- | --- |
| Temperature, °C. | 100-122 | 81-127 | 88-133 |
| Pressure, mm. Hg. | (1) | 28-37 | 26-27 |
| Time of Reaction, hrs. | 13 | 16 | 6.5 |
| Charge: | | | |
| (A) Triisobutylaluminum, gms. | 131 | 72 | 91 |
| (B) Octene-1 | 433.5 | 436 | 360 |
| Average Concentration of Octene-1, percent by weight | 20.6 | 1 | 1 |
| Product Recovery: | | | |
| (A) Total Product, gms. | 293 | 135 | 156 |
| (B) Unreacted Octene-1, gms. | 167 | 311 | 206 |
| (C) Octene-1 Consumed, gms. | 266.5 | 125 | 154 |
| (D) Theoretical Amount of Octene-1 Required, gms. | 212 | 125 | 154.5 |
| (E) Isobutene Evolved, gms. | 92.5 | 56 | 67 |
| (F) Theoretical Amount of Isobutene Expected, gms. | 111 | 58 | 72.5 |

[1] Atmospheric.

In Experiment 1 the unreacted octene-1 was condensed and returned to the reaction zone, while in Experiments 2 and 3 the unreacted octene-1 was continuously removed throughout the reaction period to maintain the desired concentration. The concentration of octene-1 was based on the total amount of triisobutylaluminum and transalkylated product present. Octene-1 was added continuously to the reaction zone throughout the reaction period.

It can be seen from the data in Table I that in Experiment 1 wherein the concentration of olefin was not controlled more than the theoretical amount of olefin was consumed indicating dimerization. In Experiments 2 and 3, however, wherein the concentration of olefin was maintained well within the desired limits at all times, the amount of octene-1 consumed is just about equal to that theoretically required.

The transalkylated product obtained above was thereafter hydrolyzed, with the product from Experiment 1 being divided into two portions. The data obtained are summarized below in Table II.

Table II

| Experiment No. | 1A | 1B | 2 | 3 |
| --- | --- | --- | --- | --- |
| Temperature, °C. | 11-55 | 25-51 | 26-66 | 25-80 |
| Pressure | (1) | (1) | (1) | (1) |
| Time, hours | ¾ | ¼ | ¾ | 2 |
| Hydrolyzing Agent, gms. (Mixture of 50 percent by weight of 38 percent HCl and 50 percent by weight of H₂O) | 250 | 200 | 150 | 200 |
| Wt. of Sample Hydrolyzed, gms. | 112 | 62 | 135 | 156 |
| Yield of N-Octane, gms. | 70.35 | 37.2 | 114.05 | 134.5 |
| Yield of Dimer as C₁₆ Olefin, gms. | 20 | 9 | 3 | None |

[1] Atmospheric.

In Experiment 2 above an additional 30 grams of water was present in the hydrolyzing medium defined. Note that in Experiments 1A and 1B, which relate to the transalkylated product obtained in Experiment 1 from Table I, that a substantial amount of dimerization occurred. In Experiment 2, however, less than 3 grams of dimer formed, while in Experiment 3 no dimer formation was observed.

Obviously many modifications and variations of the invention, as hereinabove set forth, can be made without departing from the spirit and scope thereof and therefore only such limitations should be imposed as are indicated in the appended claims.

I claim:

1. A process for transalkylating an aluminum alkyl which comprises reacting said aluminum alkyl with an olefin while maintaining less than about 6 percent of said olefin in said aluminum alkyl throughout the reaction period.

2. A process for transalkylating an aluminum alkyl which comprises reacting said aluminum alkyl with an olefin at a temperature of about 0° to about 300° C. and a pressure of about one millimeter of mercury to about 1000 pounds per square inch while maintaining less than about 6 percent of said olefin in said aluminum alkyl throughout the reaction period.

3. A process for transalkylating an aluminum alkyl which comprises reacting said aluminum alkyl with an olefin at a temperature of about 0° to about 300° C. and a pressure of about one millimeter of mercury to about 1000 pounds per square inch while maintaining less than about 6 percent of said olefin in said aluminum alkyl throughout the reaction period, said aluminum alkyl being in liquid phase and said olefin being in vapor phase during the reaction period.

4. A process for transalkylating triisobutylaluminum which comprises reacting said triisobutylaluminum with an olefin while maintaining less than about 6 percent of said olefin in said triisobutylaluminum throughout the reaction period.

5. A process for transalkylating triisobutylaluminum which comprises reacting said triisobutylaluminum with an olefin at a temperature of about 0° to about 300° C. and a pressure of about one millimeter of mercury to about 1000 pounds per square inch while maintaining less than about 6 percent of said olefin in said triisobutylaluminum throughout the reaction period.

6. A process for transalkylating triisobutylaluminum which comprises reacting said triisobutylaluminum with an olefin at a temperature of about 0° to about 300° C. and a pressure of about one millimeter of mercury to about 1000 pounds per square inch while maintaining less than about 6 percent of said olefin in said triisobutylaluminum throughout the reaction period, said triisobutylaluminum being in liquid phase and said olefin being in vapor phase during the reaction period.

7. A process for transalkylating triisobutylaluminum which comprises reacting said triisobutylaluminum with octene-1 at a temperature of about 0° to about 300° C. and a pressure of about one millimeter of mercury to about 1000 pounds per square inch while maintaining less than about 6 percent of said octene-1 in said triisobutylaluminum throughout the reaction period, said triisobutylaluminum being in liquid phase and said octene-1 being in vapor phase during the reaction period.

8. A process for transalkylating triisobutylaluminum which comprises passing octene-1 in vapor form through triisobutylaluminum in liquid form at a temperature of about 100° C. for about 7 hours, maintaining the concentration of the octene-1 in said triisobutylaluminum at less than 6 percent, removing a gaseous mixture comprising unreacted octene-1 and isobutylene resulting from the reaction from the reaction zone, and separately recovering said unreacted octene-1 and said isobutylene.

9. The process of claim 1 wherein the concentration of said olefin is maintained at about 1 percent throughout the reaction period.

10. The process of claim 2 wherein the concentration of said olefin is maintained at about 1 percent throughout the reaction period.

11. The process of claim 3 wherein the concentration of said olefin is maintained at about 1 percent throughout the reaction period.

12. The process of claim 4 wherein the concentration of said olefin is maintained at about 1 percent throughout the reaction period.

13. The process of claim 5 wherein the concentration of said olefin is maintained at about 1 percent throughout the reaction period.

14. The process of claim 6 wherein the concentration of said olefin is maintained at about 1 percent throughout the reaction period.

15. The process of claim 7 wherein the concentration of said olefin is maintained at about 1 percent throughout the reaction period.

16. The process of claim 8 wherein the concentration of said olefin is maintained at about 1 percent throughout the reaction period.

References Cited in the file of this patent

UNITED STATES PATENTS 2,695,327    Ziegler et al. _____ Nov. 23, 1954

OTHER REFERENCES

Angewandte Chemie, vol. 67, p. 424, Aug. 21, 1955.